J. E. FINN.
TESTING ATTACHMENT FOR SPARK PLUGS.
APPLICATION FILED NOV. 1, 1919.
1,365,972.
Patented Jan. 18, 1921.
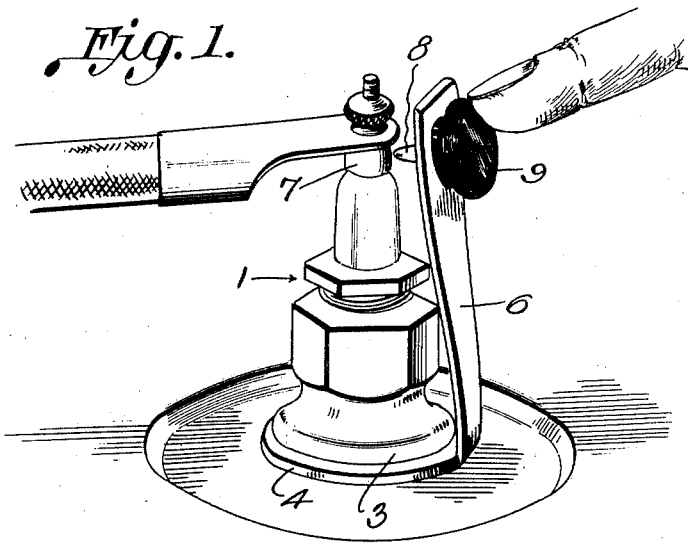
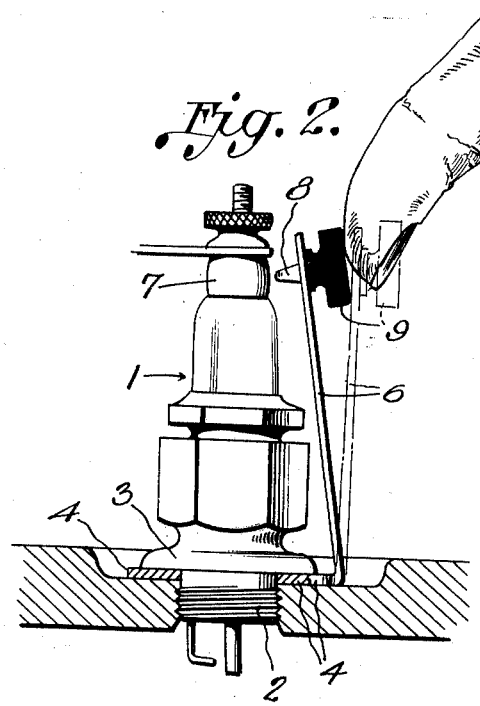
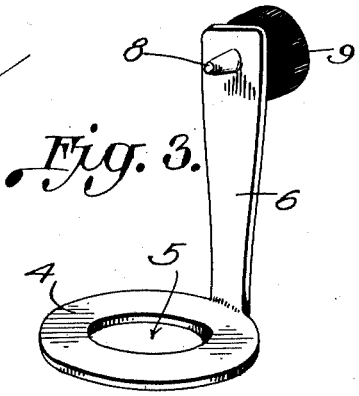
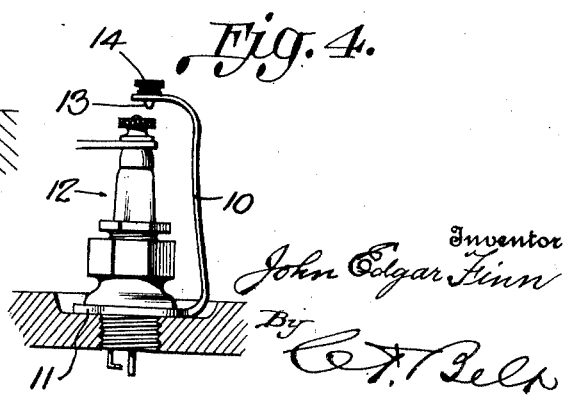
Witnesses
Inventor
John Edgar Finn
By
Attorney

UNITED STATES PATENT OFFICE.

JOHN EDGAR FINN, OF BROOKLYN, NEW YORK.

TESTING ATTACHMENT FOR SPARK-PLUGS.

1,365,972.   Specification of Letters Patent.   Patented Jan. 18, 1921.

Application filed November 1, 1919. Serial No. 335,098.

*To all whom it may concern:*

Be it known that I, JOHN EDGAR FINN, a citizen of the United States, residing at Brooklyn, in the county of Kings and State of New York, have invented certain new and useful Improvements in Testing Attachments for Spark-Plugs, of which the following is a specification.

This invention relates to spark plugs, and pertains especially to an attachment for testing the working condition of spark plugs in general use.

The object of the invention is to provide a testing device for spark plugs which shall constitute a gasket or washer between the plug and the engine cylinder, whereby the said device is attached, and which also comprises a resilient arm having normal position adjacent to the head of the plug for forming a gap, said arm adapted to be operated by hand or finger for closing the gap in a plug testing operation.

A further object of the invention is to provide a spark testing device for spark plugs, having such shape and construction as to be applicable to any of the well known plugs in common use, and affording a gasket plugs in common use, and affording a gasket or washer for the plug, and a spring arm adapted to be operated by finger or hand pressure for closing a gap and thereby producing sparks during proper working condition of the plug.

Various other objects, advantages and improved results are attainable in the manufacture and practical application of the invention as will hereinafter appear.

In the accompanying drawings forming part of this application:—

Figure 1 is a perspective view showing the application of the testing device to an ordinary spark plug.

Fig. 2 is a sectional elevation showing the normal position of the sparking arm in dotted lines.

Fig. 3 is a detail perspective view of the testing device.

Fig. 4 is an elevation showing a modification.

The same reference characters denote the same parts throughout the several views of the drawings.

The spark plug 1, shown in the accompanying drawings and hereinafter referred to, is only one of many forms which might be used to exemplify the application of the invention, such plugs having the usual screw stem 2 for attaching to an engine cylinder, and such plug having a flange 3 surmounting the stem.

In carrying out my invention, I preferably employ one piece of metal having such properties as to afford a gasket or washer member 4 having a central hole 5 fitting the stem 2 and of such width as to form a bearing for the plug flange 3. This feature of the device is made to take the place of the usual displaceable washers, and for this reason the said member 4 may be made in various thicknesses, but it has been found that the usual washer thickness is preferable for general or universal use.

The testing device further comprises a flexible or resilient member forming a spring arm 6 projecting at right angles from the base or washer member 4, and of such length as to reach the top portion 7 of a spark plug, where the free end of said arm stands opposite said portion in normal position so as to form a spark gap therebetween. The free end of the arm 6 has a contact point 8, and is provided with an insulator button 9, adapted to be engaged by the hand or finger for operating the arm to close the gap, and thereby produce sparking operation.

Referring to the modification shown in Fig. 4 of the drawings, the spring arm 10 is curved or bowed lengthwise from the base or washer 11 and is of such length as to overhang the top of the spark plug 12. The overhanging end has a contact point 13 and an insulator finger button 14.

It will be observed that this testing device constitutes an electric conductor, that it is readily demountable and interchangeable for plugs of various types and sizes, that its function as a washer is highly desirable in view of frequent displacement and loss of the ordinary washers, and that in mounting and demounting a spark plug this washer may be held in place by the arm 6.

It will be further observed that this device affords means for preventing an electric shock to the operator, by reason of the washer member being held in place by the base of the plug, thus avoiding high tension electrode connections.

While I have shown the device as made in one piece and of the same metal, obviously the base may be composed of a softer metal than the spring arm, and joined together in any suitable manner. Therefore, I do not wish to limit myself as to material, size and shape, nor with respect to the contact of the free end of the arm, nor to the arm insulator button, nor to the application of the device to any particular spark plug, but reserve the right to make such changes and variations in the manufacture and practical application of the invention as may not be inconsistent with the appended claim.

Having thus described my invention what I claim as new and desire to secure by Letters Patent is:

A testing device for spark plugs, comprising a member fitting under and forming a washer for the base of the plug, and an electric conductor arm formed on and projecting from said member and terminating adjacent to the top of the plug for resiliently coöperating with the plug in a testing operation.

In witness whereof I hereunto set my hand in the presence of two witnesses.

JOHN EDGAR FINN.

Witnesses:
AMELIA MARGARITE FINN,
ALBERT MASETZEK.